Fig: 8
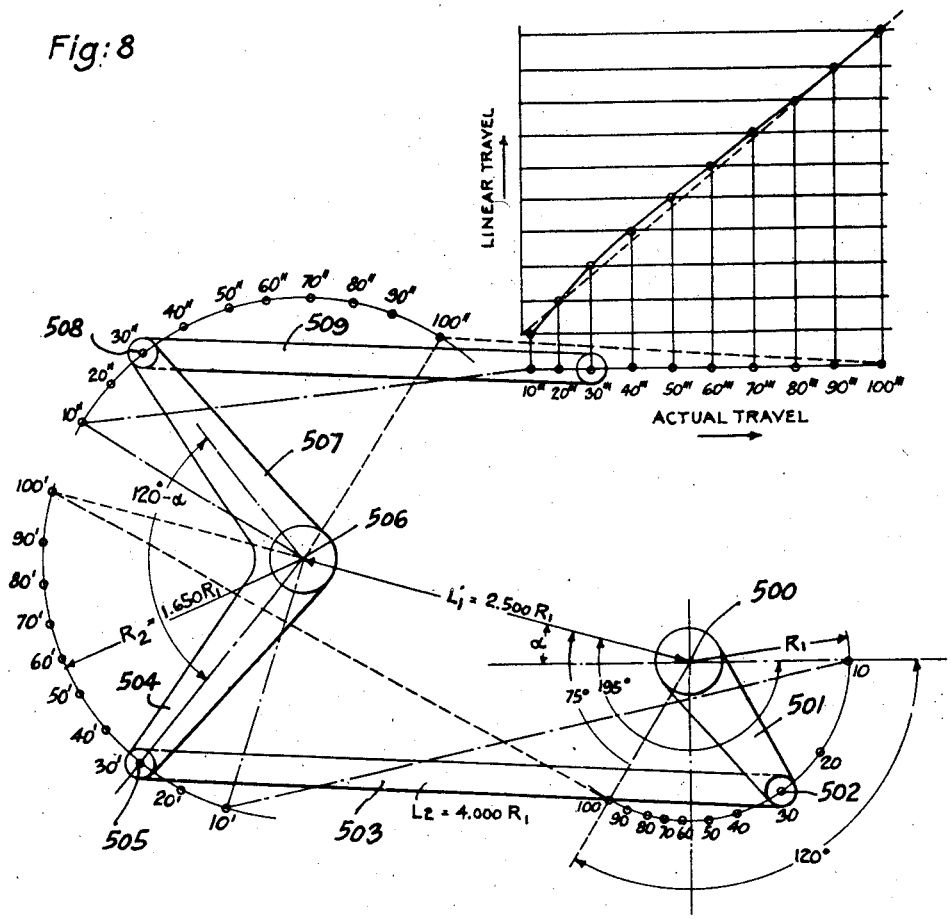
Fig: 3
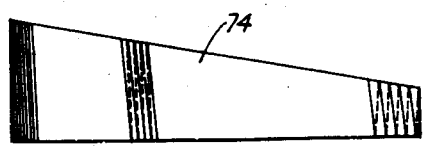
Alfred Simmon
Louis L. Weisglass
INVENTOR.
BY Walter E. Wallheim Nov. 4, 1947.  A. SIMMON ET AL  2,430,253
PHOTOELECTRIC EXPOSURE AND CONTRAST CONTROLS FOR ENLARGERS
Filed June 21, 1946  8 Sheets-Sheet 4
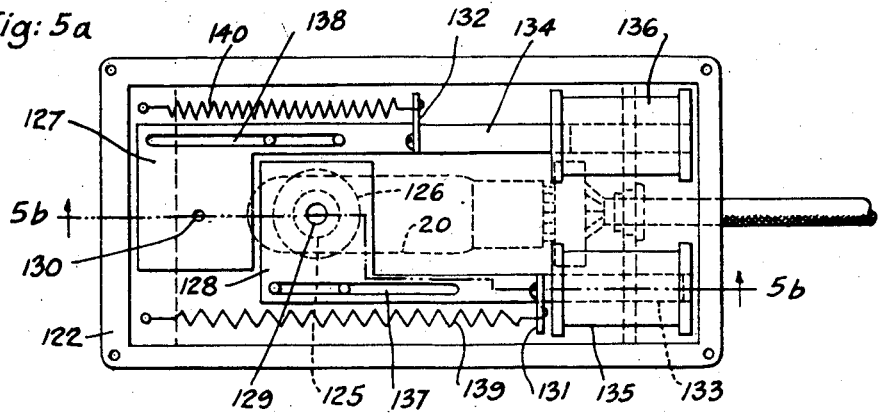
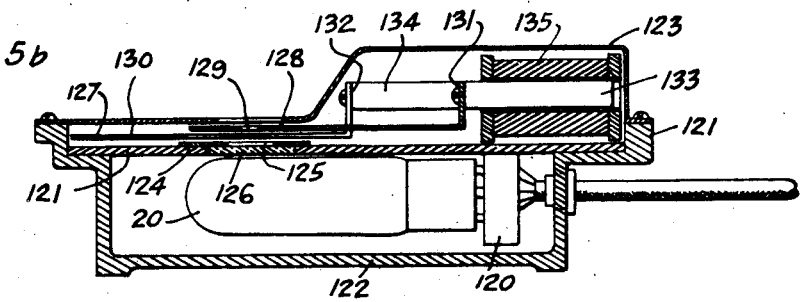
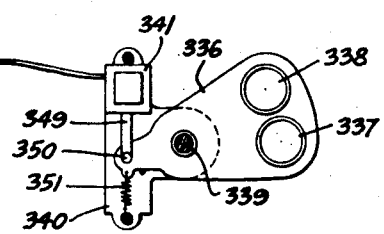
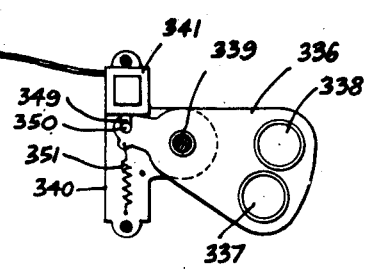
Alfred Simmon
Louis L. Weisglass
INVENTOR.
BY Walter E. Wallheim
ATTORNEY.

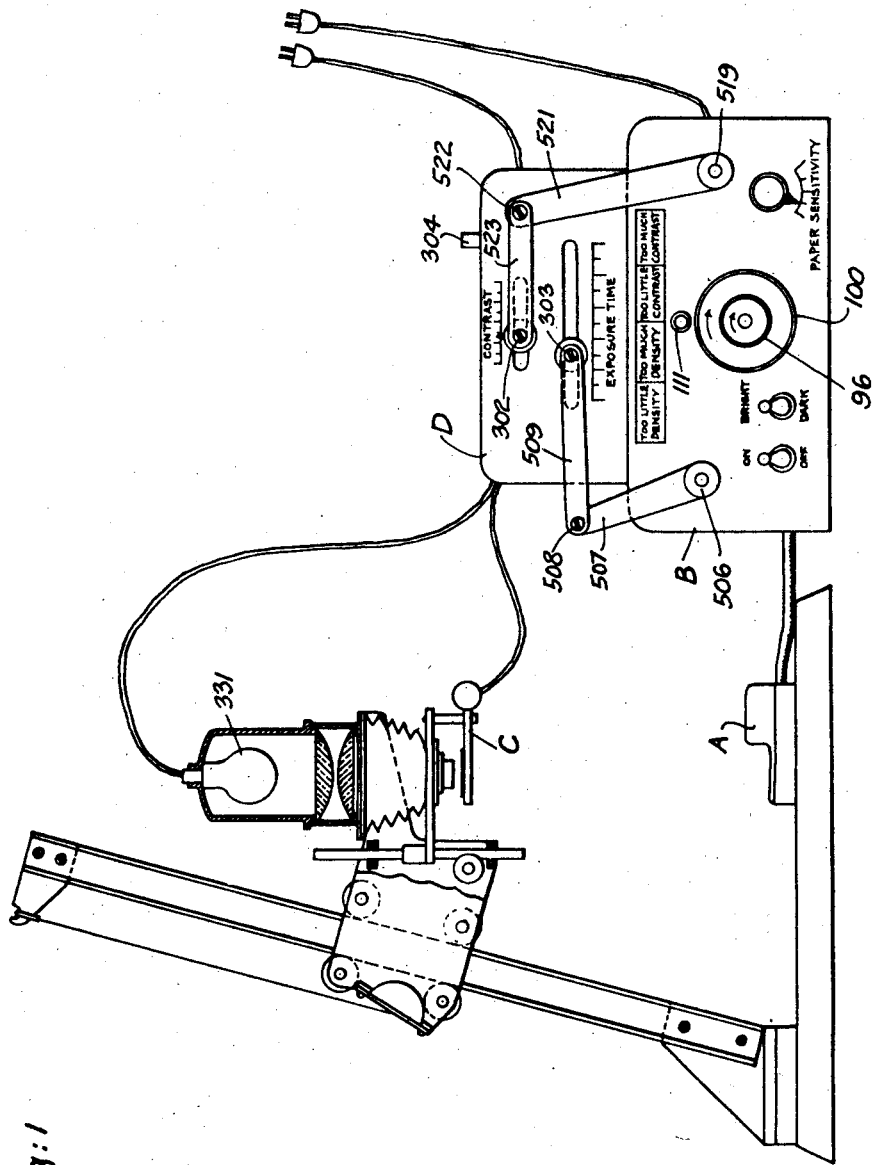
Fig: 1
Alfred Simmon
Louis L. Weisglass
INVENTOR.
BY *Walter E. Wollheim*
ATTORNEY.

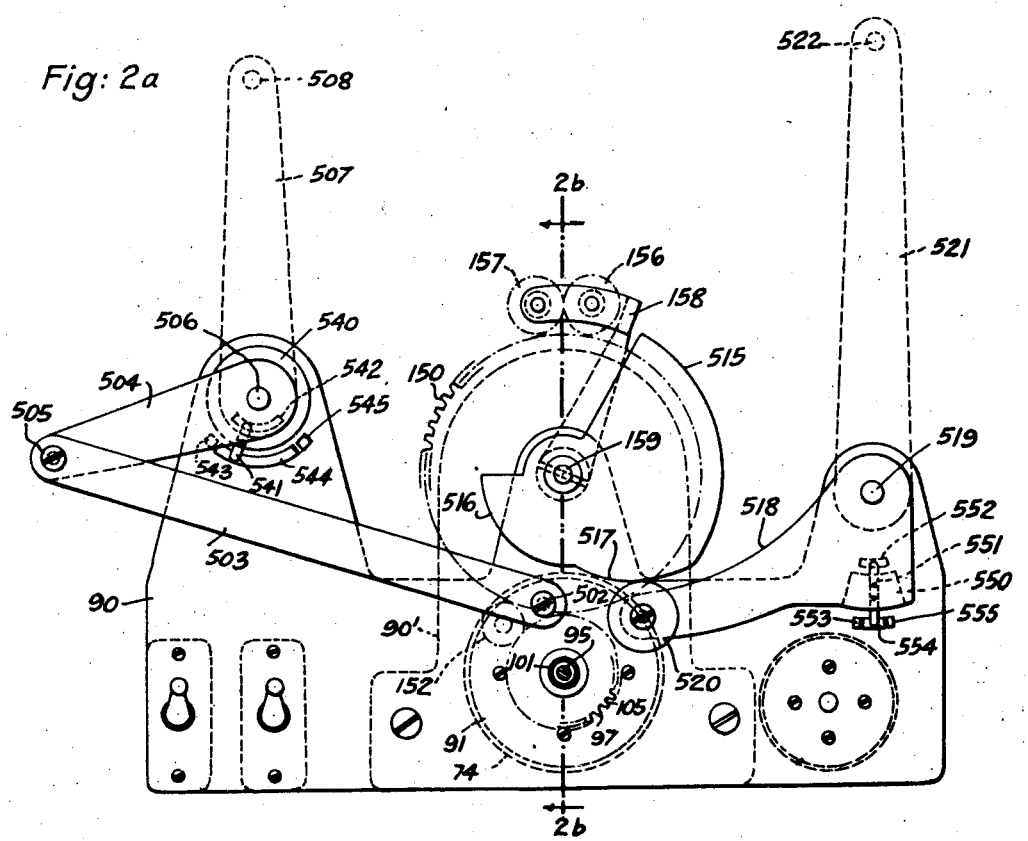
Fig: 2a
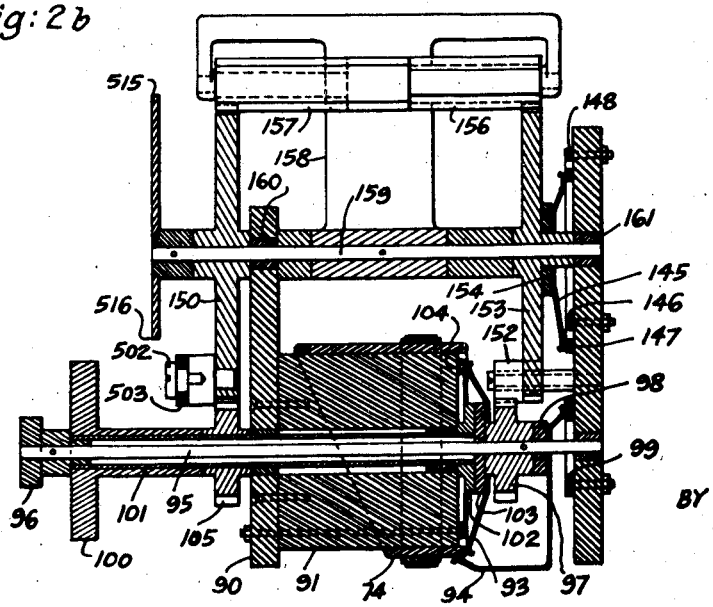
Fig: 2b
Alfred Simmon
Louis L. Weisglass
INVENTOR.
BY Walter E. Wellheim
ATTORNEY.

Nov. 4, 1947.  A. SIMMON ET AL  2,430,253
PHOTOELECTRIC EXPOSURE AND CONTRAST CONTROLS FOR ENLARGERS
Filed June 21, 1946  8 Sheets-Sheet 5
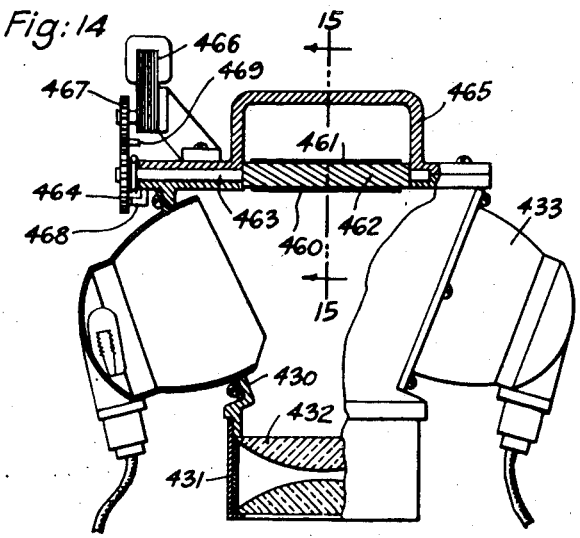
Fig:14
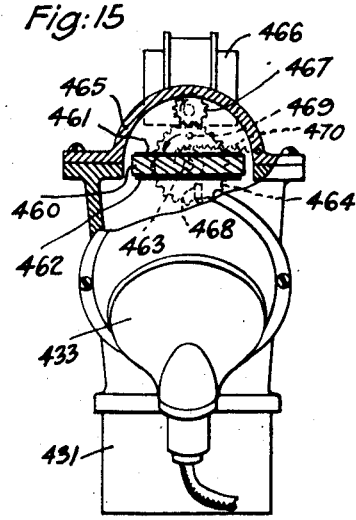
Fig:15
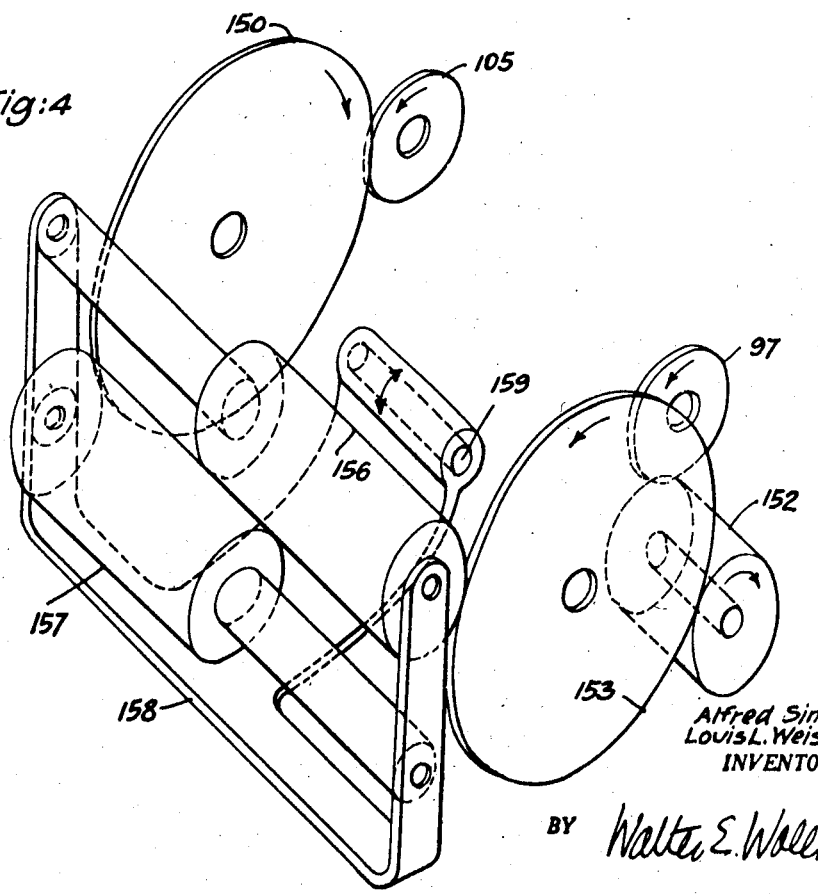
Fig:4
Alfred Simmon
Louis L. Weisglass
INVENTOR.
BY Walter E. Wollheim
ATTORNEY.

Nov. 4, 1947.  A. SIMMON ET AL  2,430,253
PHOTOELECTRIC EXPOSURE AND CONTRAST CONTROLS FOR ENLARGERS
Filed June 21, 1946  8 Sheets-Sheet 6
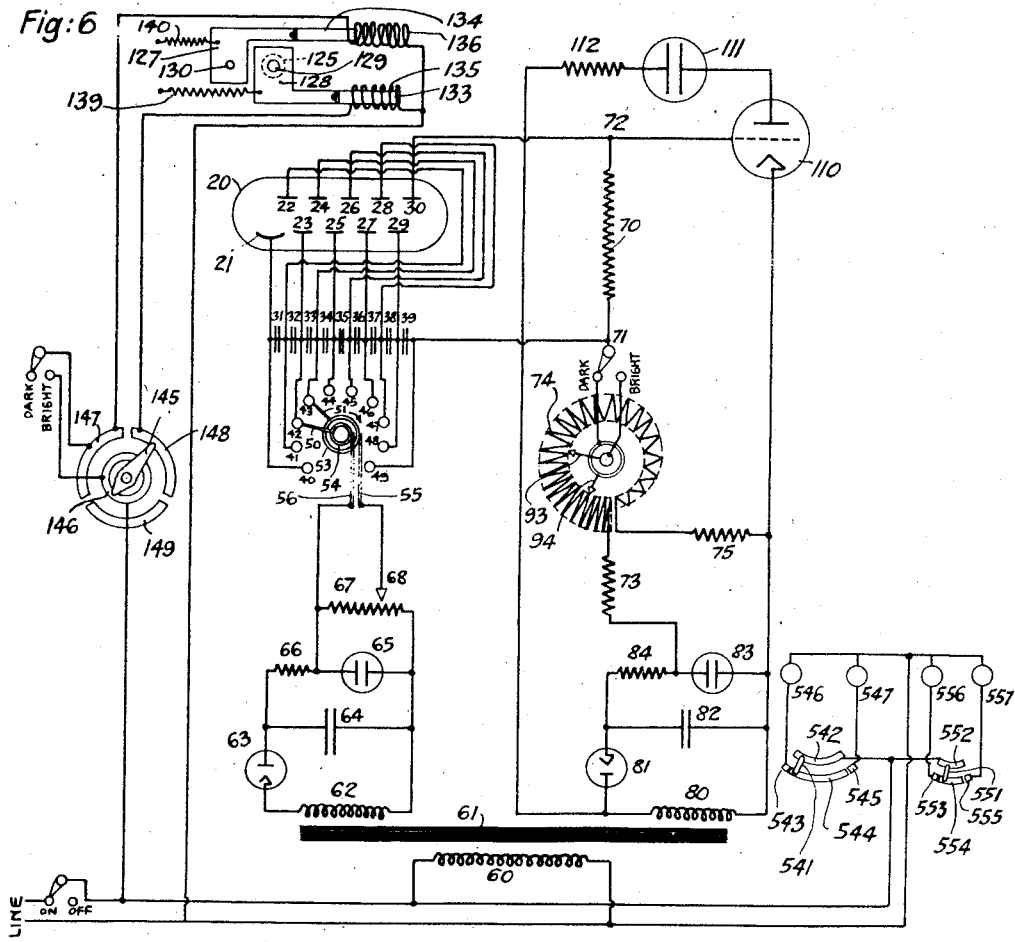
Fig:6
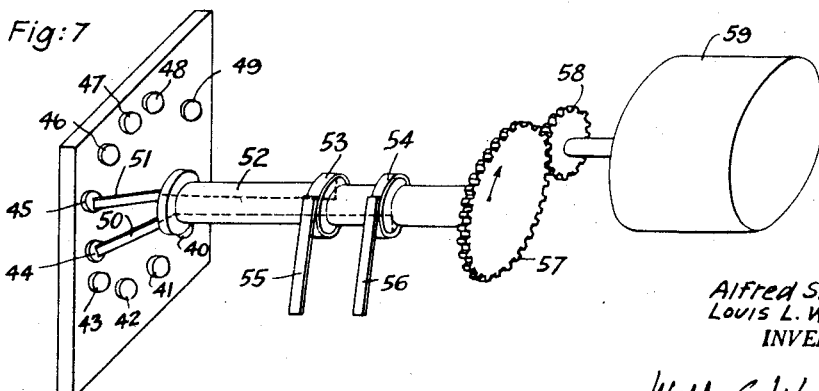
Fig:7
Alfred Simmon
Louis L. Weisglass
INVENTOR.
BY Walter E. Wallheim
ATTORNEY.

Fig: 9
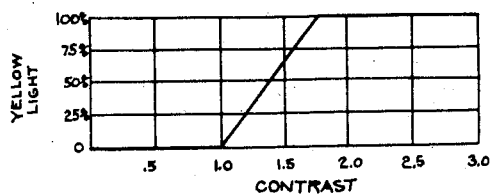
Fig: 10a
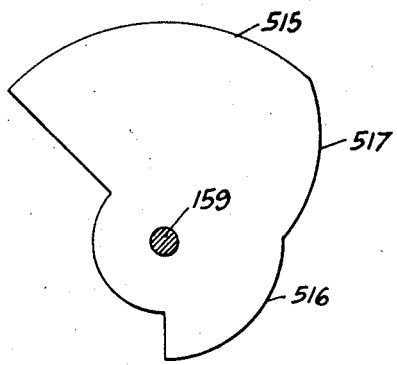
Fig: 10b
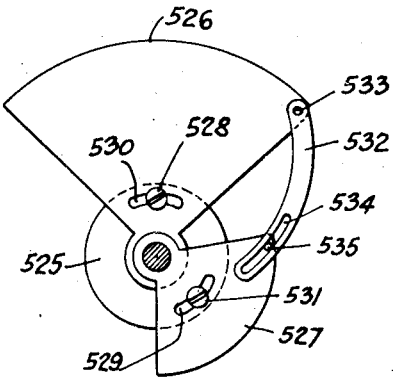
Fig: 12
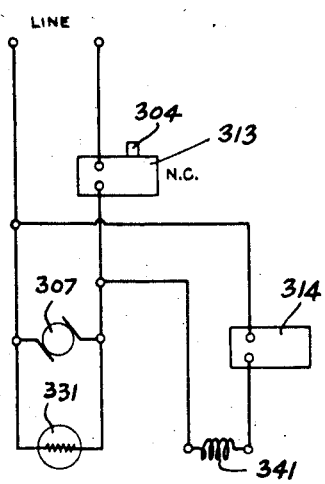
Alfred Simmon
Louis L. Weisglass
INVENTOR.
BY *Walter E. Wallheim*
ATTORNEY.

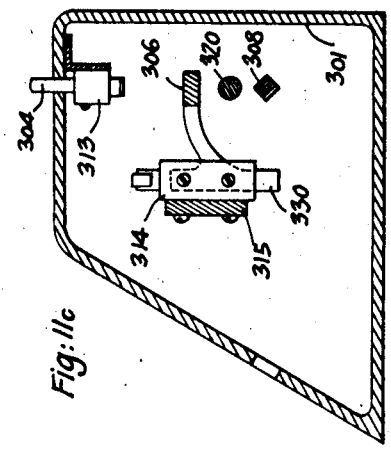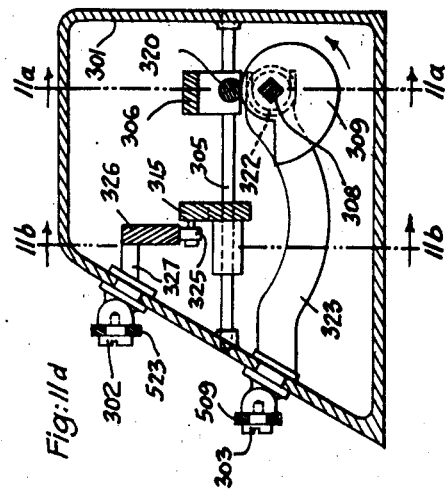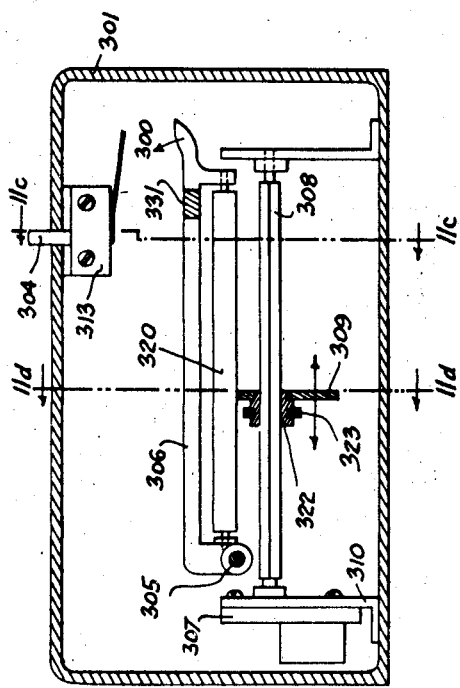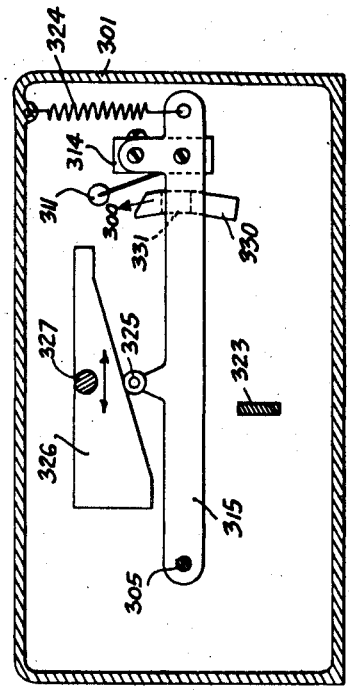

Patented Nov. 4, 1947

2,430,253

UNITED STATES PATENT OFFICE 2,430,253

PHOTOELECTRIC EXPOSURE AND CONTRAST CONTROL FOR ENLARGERS

Alfred Simmon, Jackson Heights, and Louis L. Weisglass, New York, N. Y., assignors to Simmon Brothers, Inc., Long Island City, N. Y., a corporation of New York Application June 21, 1946, Serial No. 678,174

24 Claims. (Cl. 88—24)

The object of this invention is an instrument which controls the performance of a photographic enlarger. The enlarger is assumed to be of the usual type which projects a generally enlarged image of a photographic negative upon a sheet of sensitized paper which has been placed on an easel. The instrument which is the object of this invention comprises a photoelectric cell by means of which the operator measures the light intensity of the brightest and of the darkest point on the easel, whereupon, by means of a mechanism described herein, automatically all adjustments are made so that a print subsequently made receives automatically the correct exposure and the correct grade of contrast.

In order to accomplish this object, we use the following instrumentalities in cooperative relationship with each other:

1. A photoelectric cell adapted to be placed on the easel.
2. An electric circuit connected to said cell including means to indicate the magnitude of the current passing the cell.
3. Mechanism including two members adapted to be moved in accordance with the light intensity of the darkest and the brightest point on the easel, respectively.
4. Mechanism adapted to be moved in accordance with the ratio of the light intensities of the darkest and the brightest point, said mechanism being actuated by the first mentioned mechanism.
5. A time switch controlling the length of the exposure.
6. Contrast control means permitting the contrast or gradation of the print to be varied.
7. Automatic means to set the timer by the mechanism described under 3.
8. Automatic means to set the contrast control by the mechanism described under 4.

In this manner a completely integrated unit is being formed by means of which not merely a correctly exposed print is being obtained, but also one which has a proper degree of contrast.

A preferred embodiment of this invention is illustrated in the attached drawings in which Fig. 1 shows the general appearance of the instrument in connection with a typical enlarger;

Fig. 2a is a plan view and Fig. 2b a cross-sectional view along the plane of line 2b—2b in Fig. 2a, showing the most important part of this invention comprising a rheostat with two contacts, a gear system connected to the two rheostat contacts, a linkage system connected to the gear system and adapted to set the time switch, and a cam and lever system connected to the gear system and adapted to actuate the contrast control;

Fig. 3 is a logarithmically attenuated resistor which forms part of the aforementioned rheostat;

Fig. 4 is an axonometric view of the gear system in which, in the interest of simplicity, gears have been represented as simple circles or cylinders, the individual teeth not having been shown;

Fig. 5a is a plan view and Fig. 5b a cross-sectional view along the plane of line 5b—5b in Fig. 5a, showing the photoelectric cell and its housing, with the cover removed in Fig. 5a;

Fig. 6 is the electric circuit of the device without the time switch, which will be shown later;

Fig. 7 is a motor driven rotating switch which forms part of the circuit;

Fig. 8 is a partly diagrammatical view of the linkage system which connects the gear system and the time switch;

Fig. 9 is a graph showing the relation between contrast and color composition of the preferred contrast control method;

Figs. 10a and 10b show two modifications of a cam constructed according to the relationship shown in Fig. 9, these cams being part of a cam and lever system connecting the gear system to the contrast control means;

Fig. 11a is a sectional view along the plane of line 11a—11a in Fig. 11d showing the time switch including a separate contact which will be used for the contrast control means described below; Fig. 11b is a sectional view of the same along the plane of line 11b—11b in Fig. 11d; Fig. 11c is a cross-sectional view of the same along the plane of line 11c—11c in Fig. 11a; and Fig. 11d is a cross-sectional view along the plane of line 11d—11d in Fig. 11a;

Fig. 12 is the wiring diagram of this time switch;

Figs. 13a and 13b show in different positions colored filters to control the predominant color of the light with which the print is being made, these color changing means being used for purposes of adjusting the contrast of the print;

Fig. 14 shows a sectional view, partly in elevation, showing a device serving the same purpose, but using colored reflectors; and Fig. 15 a cross-sectional view along the plane of line 15—15 in Fig. 14.

Like characters of reference denote similar parts throughout the several views and the following specification:

General principle

In its preferred embodiment this invention comprises a photoelectric cell mounted in a suitable housing which can be placed on the easel so that individual image elements thereupon can be analyzed. This photoelectric cell is associated with an electric circuit which enables the operator to measure the magnitude of the current passing the cell. For this purpose, two part circuits are provided, the output voltage of the first part circuit being directly controlled by said photoelectric cell and the output voltage of the second circuit being controlled by a manually operated rheostat. A separate balance indicator shows when the difference between the two output voltages assumes a predetermined value. The rheostat is equipped with two independent sliding contacts which may be selectively connected into the circuit. One of these contacts is set while the photoelectric cell is placed on the point of brightest illumination on the easel, and the other one is set while the cell is placed on the darkest part of the easel. Each of these contacts is mechanically connected to a movable member, and a mechanism setting a time switch is preferably associated with the member which follows the contact adapted to be set for the point of brightest illumination. A differential mechanism, preferably a differential gear, is acted upon by the aforementioned two members, and in turn, actuates a third member which moves in accordance with the difference of the settings of the first two members. Finally, mechanism is provided by means of which said third member automatically adjusts a device controlling the contrast of the print.

General design

The appearance of the complete instrument is illustrated in Fig. 1 where it is shown in connection with a typical enlarger. The instrument consists of two principal parts, the first which may be called the exposure and contrast measuring device and the second which comprises the time switch and the contrast control device. The exposure and contrast measuring device is substantially identical with the one disclosed in co-pending application Serial No. 664,149 filed by Louis L. Weisglass, one of the co-inventors, but mechanism has been added to connect this instrument to the time switch and contrast control device. The time switch and contrast control device is substantially identical with the one disclosed in Patent No. 2,414,338 issued to applicants on January 14, 1947.

The exposure and contrast measuring device, in turn, consists of two parts, the photocell with its housing A and a cabinet B. Both are connected by a multiple conductor cable. The cabinet B contains all circuit elements such as the transformer, rectifying tubes, capacitors and others, as well as the main mechanism shown in detail in Figures 2a and 2b. The front dial shows an "on" and "off" switch, a second switch which is actuated by the operator, depending upon whether he measures the brightest or the darkest point on the easel, two concentric handwheels 96 and 100 by means of which the two sliding contacts of the main rheostat can be set, an additional potentiometer changing the light intensity of the circuit in accordance with the sensitivity of the sensitized paper on which the print is being made, and a neon lamp 111 which acts as a balance indicator for the circuit. Protruding from this dial are two rotatable arms 507 and 521 which, by means of two connecting rods 509 and 523 connect the mechanism contained in B to the time switch and contrast control.

The time switch and contrast control again consists of two parts, the color changing device C and the cabinet D which are also connected by cables. This cabinet contains a time switch of peculiar construction which will be described later and which comprises an additional contact by means of which the color changing device can be actuated at a pre-selected time during the exposure. Cabinet D has a front face carrying a dial calibrated in exposure time values and a second dial calibrated in contrast values. On top of the dial is a push button 304 which initiates the exposure.

Photoelectric cell

Basically the photoelectric cell may be of any of the several types well known in the art, but in practice, we prefer to use a so-called electron multiplier tube since in this manner no separate and complex amplifier will be necessary. An electron multiplier tube comprises an evacuated glass vessel with a plurality of electrodes. The first of these electrodes has a coating of a suitable metal, usually potassium or caesium and has, in a manner well known in the art, the property to emit electrons upon exposure to light. A supply circuit which will be explained in detail below imposes a suitable voltage between two subsequent electrodes, each electrode being positive with respect to the preceding one. The relatively few electrons emitted by the first photoemissive electrode are thereby attracted by the second electrode and, striking this second electrode, release a certain number of secondary electrons. This number of secondary electrons is larger than the number of the primary electrons causing their release, and the property of the tube to "multiply" electrons is based on this fact. These secondary electrons are made to impinge upon the third electrode, releasing there a still larger number of "tertiary" electrons, and this process is repeated at each subsequent stage until a very high amplification factor is obtained in this manner. Referring to the circuit diagram, Fig. 6, the glass vessel of the multiplier tube is called 20. The first photoemissive electrode is called 21 and subsequent electrodes are called 22 to 30.

Supply circuit for multiplier tube

The voltage required between two subsequent electrodes is of the general order of 100 volts and since a typical tube has ten electrodes, a voltage of approximately 1000 volts, together with a suitable voltage divider with ten steps would be necessary. Since a device of this character is expensive and has also several other disadvantages, we make use of a supply circuit which has already been fully disclosed in co-pending application Serial No. 585,350, filed by Louis L. Weisglass, one of the co-inventors. This supply circuit uses a battery of condensers or capacitors 31 to 39 inclusive. The intermediate points of this battery are connected as shown to subsequent electrodes of the multiplier tube. These intermediate points are also connected to switch buttons 40 to 49 which are mounted in a circle on a plate made from suitable insulating material. This arrangement is shown in Fig. 7. The assembly of switch buttons is mounted opposite to two rotating contacts 50 and 51 which are mounted on a shaft 52 made also from insulating material. Mounted on this shaft are two slip rings 53 and 54 which are connected to the two rotating contacts 51 and 50 respectively. These slip rings, in turn, are in current conducting relationship with two brushes 55 and 56, and the entire assembly comprising the shaft 52, the slip rings 53 and 54, and the contacts 51 and 50 is kept rotating by means of two gears 57 and 58 and a small motor 59. The two brushes 55 and 56 are, in turn, connected to a suitable source of direct current. This source must supply a direct current of a voltage substantially equal to the voltage required between subsequent electrodes of the multiplier tube, but may otherwise be of any convenient design such as a battery, for instance. As a preferred example, we show a transformer with a primary coil 60, an iron core 61 and a secondary coil 62. The secondary coil 62 delivers a certain A. C. voltage which passes the rectifying tube 63 and charges the condenser 64. Since it is desirable to have the output voltage of this condenser rendered constant and independent of accidental line voltage fluctuations, we provide a gas filled regulator tube 65 in series with a resistor 66. Parallel to the regulator tube 65 is a potentiometer 67 including a sliding contact 68 by means of which the voltage impressed upon the brushes 53 and 54 can be adjusted.

By means of this potentiometer the total voltage impressed upon the multiplier tube can be adjusted. Only a relatively small adjustment is necessary since the sensitivity of multiplying tubes follows approximately the seventh power of the impressed voltage. This adjustment can very conveniently be utilized to adjust the sensitivity of the photoelectric circuit in accordance with the sensitivity of the sensitized paper which happens to be used.

For a more complete description of this method to energize vacuum tubes of the multiplier type, we wish to refer to the aforementioned co-pending application No. 585,350.

*Measuring circuit*

It is necessary to provide means to indicate the magnitude of the electric current passing the photoelectric tube in response to the received illumination. These indicating means may comprise, for example, a sensitive microammeter but, in practice, we prefer to use the following system: Two part circuits are provided, the output voltage of the first part circuit being controlled by the photoelectric cell and the output circuit of the second circuit being manually controlled by suitable means, for example, a rheostat. The output voltages of both circuits are made to oppose each other, and indicating means are provided to indicate when the difference between the two output voltages assumes a predetermined value.

*Photoelectric part circuit*

Most of the salient parts of this part circuit have already been described and it is merely necessary to mention at this point that the output of the multiplier tube is impressed on a resistance 70. The voltage between points 71 and 72 is in direct proportion to the illumination which impinges upon the electrode 21 of the multiplier tube.

*Manually controlled part circuit*

This part circuit is shown on the right side of Fig. 6. It consists of a source of D. C. which is impressed upon the three resistors 73, 74 and 75 which are connected in series. Resistors 73 and 75 are fixed but resistor 74 forms part of a potentiometer which will be described in detail below. The source of direct current which passes these three resistors may be a battery or any other suitable source and merely as a preferred means we use a transformer, a rectifying tube and a condenser. The transformer may be a separate transformer or, more conveniently, a secondary coil 80 may be wound on the same iron core 61 which is already being used for the transformer of the photoelectric part circuit. The alternating current delivered by this secondary is passing a rectifying tube 81 and charging a condenser 82. The terminals of this condenser are connected to a second gas filled regulator tube 83 which is in series with a fixed resistance 84. The three aforementioned resistors 73, 74 and 75 constitute the load circuit and are connected in parallel to the regulator tube 83. The voltage impressed upon these three resistors is thereby rendered constant and independent of accidental line voltage fluctuations.

We have not shown any current supply for the filaments of the two rectifying tubes 63 and 81 as well as for the thyratron 110 to be mentioned later. Means to supply these filaments with current are well known in the art and, for example, separate transformers may be used, or additional turns of wire may be wound on the iron core 61 on the transformer that supplies the plate current for the two circuits.

*Rheostat*

The manually adjustable rheostat which controls the last named circuit is one of the most essential parts of this instrument and will, therefore, be described in detail. A cross-section is shown in Figure 2b.

The rheostat, together with the associated gear mechanism which will be described later, is mounted on a structure comprising two parallel plates 90 and 90' made from insulating material. A cylindrical body 91 made from a similar material is attached to plate 90. The two plates 90 and 90' are fastened to each other by simple studs not shown in the drawings. The cylindrical body 91 serves as a support for a resistance element 74. This resistance element comprises a relatively large number of convolutions of thin resistance wire wound on a flexible strip made from sheet fibre or other insulating material. This insulating strip is held flat while the wire is wound thereupon, but is afterwards bent into a cylindrical shape and attached to the cylindrical support 91. It is desirable to shape this resistance element so that the rheostat has a logarithmic attenuation. For this reason, the supporting strip is given a trapezoidal shape as shown in Figure 3. This shape, of course, will cause the rheostat to have a lower resistance value per unit length at one end than at the other. This, by itself, will not as yet give a true logarithmic attenuation and the wire is, therefore, wound on this trapezoidal element with a variable pitch, the convolutions being relatively close together on the high side of the supporting strip and relatively far apart on the low side. By varying the pitch of the wire in a suitable manner, a very satisfactory approximation of a logarithmic attenuation can be obtained.

Two sliding contacts 93 and 94 slide on resistance element 74. These contacts are insulated from each other and are fastened to two rotatable coaxial shafts. The inner shaft 95 is actuated by the smaller of the two coaxial handwheels 96 and carries a gear 97, the purpose of which will be explained later. Fastened to this gear is a disc 98 made from insulated material, and contact 94, in the shape of an elastic spring made from Phosphor bronze or beryllium copper or the like, is fastened to disc 98. One end of this spring makes contact with the aforementioned resistance 74 and the other end is in contact with a ring 99 made from brass or the like. This ring serves as a connecting element to the other parts of the circuit. Spring 94 has such a shape that it does not touch the shaft 95.

The larger of the two handwheels 100 is fastened to a hollow shaft 101 made from a steel tubing or the like. Fastened to this hollow shaft is a flange 102 which, in turn, carries a disc 103 made from insulating material. This disc supports the second contact 93 which again is made from Phosphor bronze or beryllium copper. One end of this contact 93 slides on the resistance element 74 and the other end slides on a metal ring 104 made from brass or the like which is mounted on the aforementioned cylindrical body 91 made from insulating material. By means of ring 104 the rotating spring 93 is connected to the other circuit elements. A gear 105 is fastened to the hollow shaft 101.

Balance indicator

The purpose of the balance indicator is to indicate when the difference between the two output voltages of the photo electric part circuit and of the manually controlled part circuit, respectively, assume a predetermined value. This can, for example, be done by a sensitive galvanometer. In this case it would be most logical to adjust the two voltages until they are equal to each other or until their difference becomes zero. As a preferred device we are using a gas filled thyratron tube 110 in series with a load device which indicates when said thyratron becomes current conducting. This load device may be of any suitable type and again a galvanometer may very well be used. As a preferred device we use a small glow lamp 111 filled with neon or some other suitable gas. A current limiting resistor 112 is connected in series with this lamp. As can be seen in Fig. 6 the grid of the thyratron is connected to point 72, and the grid voltage of the thyratron, with respect to its filament, depends therefore upon the voltage which is impressed upon resistor 75, that portion of the resistor 74 up to the point where it makes contact with one of the sliding contacts which is in the circuit, contact 94 in this case, and resistance 70. The voltage across resistance 75 and part of resistance 74 represents the output voltage of the manually controlled part circuit. The voltage impressed upon resistance 70 represents the output voltage of the photo electric part circuit. By tracing the circuit of Fig. 6 it is apparent that the voltages are of opposite polarity, i. e., oppose each other and, therefore, the voltage between the filament and grid of the thyratron represents the difference between the output voltages of the manually controlled and of the photoelectrically controlled part circuit, respectively. A thyratron usually becomes current conducting as soon as the voltage of the grid with respect to the filament becomes higher than approximately —2 volts, and this is the voltage which, in the appended claims has been called the "predetermined value of the difference between the two output voltages of the two part circuits." In other words, if the grid is more negative than —2 volts with respect to the filament, no current will flow and the flow lamp 111 will remain dark. As soon as the negative bias of the grid with respect to the filament is less than —2 volts, current will begin to flow and the glow lamp 111 will light up. There is usually a small borderline region when the glow lamp will flicker at more or less intervals and the critical setting of the potentiometer is facilitated thereby. The plate circuit of the thyratron may be connected to any convenient source of alternating current and merely as a convenience we use the voltage delivered by the secondary coil 80 of the transformer described above. As can be seen, one end of the coil 80 is connected to the filament of the thyratron, the anode of the thyratron is connected to one side of the glow lamp 111, the other side of the glow lamp is connected to the current limiting resistance 112 which, in turn, is connected to the other side of the secondary coil 80.

Means to extend the range of the measuring circuit

The rotation of one of the sliding contacts 93 or 94 for one whole revolution will accommodate variations in the measured intensity of the light impinging upon the photoelectric cell approximately in the range of 1:10. This is usually enough for measuring the intensity of the brightest spot on the easel, particularly in view of the fact that the operator may control the light intensity within fairly wide limits by using the iris diaphragm of the enlarging lens, or possibly by other means, therefore, contact 93 has been limited to perform one revolution upon resistance element 74.

A similar limitation, however, cannot be imposed upon the other sliding contact 94 that indicates by its position the light intensity on the darkest point of the easel, because this intensity is affected not only by the intensity impinging upon the brightest spot, but also by the contrast range of the photographic negative. Contrast ranges of the order of 1:100 are not infrequent and, therefore, if we allow a variation of 1:10 for the brightest spot, the illumination of the darkest spot may vary as much as 1:1000. In order to accommodate this exceedingly wide range, we make use of an expedient which has already been disclosed in Patent No. 2,411,486 issued to Louis L. Weisglass, one of the co-inventors, on November 19, 1946.

This method consists essentially of permitting the sliding contact 94 to make several revolutions (usually 3) and changing the light admittance of the photoelectric cell after each revolution. The light admittance of the photoelectric cell is most conveniently changed by interposing suitable diaphragms with smaller or larger apertures. If one revolution of the rheostat contact 94 accommodates a range of light intensity in the proportion of 1:10 and if we provide three diaphragms with apertures varying in the proportion of 1:10:100, light intensities in the proportion of 1:1000 can be accommodated. The arrangement is shown schematically in Fig. 6 and also in Figs. 5a and 5b.

Referring to Figs. 5a and 5b, the photoelectric cell 20 is mounted in the conventional tube socket 120 which, in turn, is attached to a plate 121. This plate is mounted in a housing 122, the upper part of which is closed by a cover 123, cover 123 having been omitted in Fig. 5a. Plate 121 supports directly above the photoelectric cell a thin plate 124 with a relatively large aperture 125. Between this aperture and the photoelectric cell there is a small disc of diffusing glass 126. It is the purpose of this diffusing glass to prevent irregularities due to the fact that without it the light impinging upon the light sensitive electrode 21 may hit more or less sensitive spots thereon. By interposing this diffusing glass the entire area of this light sensitive electrode will be evenly illuminated.

Mounted on top of plate 21 are two electromagnetically controlled diaphragms 127 and 128. Diaphragm 128 has a medium sized aperture 129 which is smaller than the aforementioned large aperture 125. In the numerical example in which one revolution of the rheostat accommodates a light range 1:10, the area of aperture 129 would be 1/10 of the area of aperture 125. The diaphragm 127 has an aperture 130 which is still smaller and which in the same example would have 1/10 of the area of aperture 129 or 1/100 of the area of aperture 125. Each of these diaphragms has the shape shown in Fig. 5a, and the two diaphragms are arranged in slightly different planes as shown in Fig. 5b. Each of these plates has an upturned lug 131 and 132 respectively, and to each of these upturned lugs there is attached an iron core 133 and 134. Two electromagnetic coils 135 and 136 are provided which, when energized, attract one of these iron cores, respectively. As shown in the drawings, coil 135 is represented as being energized and has thereby attracted iron core 133 which, in turn, places diaphragm 128 in a position in which its aperture 129 is directly above the photosensitive electrode 21 of the photoelectric cell. Each of these aperture plates has a slot 137 and 138, respectively, and each of these slots engages two guide pins which can be seen in Fig. 5a. Return springs 139 and 140 are provided which return the diaphragm blades to their original positions as soon as the corresponding coil is deenergized.

Which of these coils, if any, is energized depends upon the position of a rotating switch which is shown at the left side of Fig. 6. It comprises a rotating spring 145 made from Phosphor bronze or beryllium copper or the like which makes contact with a circular ring 146 at one end and with a similar ring at the other end. The second mentioned ring, however, is split into three segmental parts 147, 148 and 149. Ring segment 147 is connected to coil 136, and ring segment 148 is connected to coil 135. The circular ring 146 is connected to one end of the line, and the two other ends of both coils 135 and 136 are connected to the other end of the line. A simple switch is provided by means of which parts 146 and 147 can be shortened. This switch is mechanically connected to a similar switch shown further to the right, above the cylindrical potentiometer of the manually controlled circuit, by means of which one or the other of the two sliding contacts 93 or 94 can be thrown into the circuit. The result of this arrangement is that when both switches are in the position for the brightest spot, not shown, automatically the smallest aperture 130 is placed in front of the photoelectric cell.

The rotating spring contact 145 is rotated by a large gear 153 which is, in turn, actuated by the aforementioned gear 97 of Fig. 2a through an intermediate gear 152. The gear 97 is mechanically connected to the rotating contact 94 of the logarithmic potentiometer and the ratio between the two gears 97 and 153 is 1:3. This arrangement accomplishes that, after each full revolution of spring 94, contact 145 moves from one segment to the next one, thereby changing the electrical connections of the diaphragm blades and the electromagnetic coils. In other words, the operator, for example, performs first one full revolution with both coils deenergized, i. e., spring 145 in contact with the non-connected segment 149. In this position both diaphragm blades are moved by their respective return springs to the left, Fig. 5, and the light admittance of the cell is controlled by the size of the diaphragm opening 125. After a full revolution of spring 94, contact 145 has made one-third of a revolution and will come in contact with segment 148 thereby energizing coil 135. This, in turn, attracts the diaphragm 138 which is now shifted to the right so that its medium sized aperture 129 is above the photoelectric cell thereby limiting its light admittance. This is the position shown in Figs. 2 and 7. After another full revolution of contact 94, the rotating contact 145 has moved another third of a revolution and will move from contact with segment 148 into contact with segment 147, thereby deenergizing coil 135 and energizing coil 136. Coil 135 will now release blade 128 which will return toward the left to its original position, and coil 136 will attract blade 137 which will now move to the right, placing the smallest diaphragm opening 130 above the photoelectric cell. The general principle of this arrangement has been fully disclosed in aforementioned Patent No. 2,411,486 and we wish to refer to this patent for a fuller description of the principles involved and the specific means employed to this end.

Gear system

The positions of the two sliding contacts 93 and 94 are, as has been explained, indicative of the light intensity of the brightest and of the darkest point on the easel, respectively. These light intensity values are transmitted to a gear system shown in Fig. 2 as well as in axonometric projection in Fig. 4.

Sliding contact 93 rotates with the hollow shaft 101. Fastened to the same hollow shaft is a small gear 105 which is in mesh with a large gear 150.

The sliding contact 94 rotates a shaft 95, and the small gear 97 is also attached to the shaft. This gear is in mesh with another small gear 152 which, in turn, is in mesh with a large gear 153. Gear 153 is in a different plane from gear 97, but has the same diameter and number of teeth as gear 150. However, due to the interposed reversing gear 152, the two large gears 150 and 153 will rotate in opposite directions, when the two gears 105 and 97, associated with the two sliding contacts 93 and 94, rotate in the same direction. Gear 153 carries an insulating disc 154 which, in turn, carries the leaf spring 145 of the rotating switch which actuates the two electromagnets of the diaphragm control of the photoelectric cell unit which has been described above.

In order to indicate the contrast of the image projected on the easel we provide an element which moves in accordance with the difference between the rotary travels of gears 153 and 150. This mechanism is preferably formed by a differential gear arrangement. While this differential gear system may be of any of the well known designs, the one we have shown in Figs. 2a, 2b and 4 may be preferred on account of its simplicity. It comprises two pinions or spur gears with relatively wide teeth 156 and 157. They are arranged in such a way that gear 156 is in mesh with gear 153 and that gear 157 is in mesh with gear 150, and that the two pinions 156 and 157 are in mesh with each other. This can be clearly seen in the axonometric projection of Fig. 4. The two pinions 156 and 157 are mounted on a bracket 158 and this bracket is fastened to a rotatable shaft 159. This shaft is supported in two bearings 160 and 161 which are attached to the plates 90 and 90' supporting the entire rheostat and gear mechanism. The function of this differential arrangement is quite simple. The angular travel of bracket 158 is equal to half the sum of the angular travels of the two large gears 150 and 153. The angular travel of gear 150 is in direct proportion to the light intensity falling upon the brightest spot of the easel, being connected to contact 83, whereas the angular travel of gear 153 is, due to the interposed reversing gear 152, negatively in proportion to the light intensity falling upon the darkest part of the easel, being connected to contact 84. Therefore, the arm 158 supporting the two pinions 156 and 157 will perform a rotary travel in proportion to the difference between the two light intensities. The shaft 159 serves also as a support for the large gears 150 and 153 which may freely rotate thereon.

*Time switch*

The time switch may be of any of the many existing designs. The one described below is preferred merely because it can easily be combined with the contrast control device to be described later.

While the most frequently used type of time switch utilizes an element traveling with constant speed and includes means to adjust the length of travel of said element, the reverse principle is used here, i. e., the moving element of the time switch always travels a constant distance regardless of the time adjustment, but means are provided to change the speed of its travel. More specifically, a pivoted lever is used which rotates by a relatively small, but constant, angle, and means are provided to adjust the speed of this rotation.

Cross-sections of the time switch are shown in detail in Figs. 11a, 11b, 11c and 11d, and the external appearance of the switch can be seen in Fig. 1. The switch comprises a housing 301, the front face of which has two slots through which protrude two slides 302 and 303. The position of these slides is indicated on two scales which indicate contrast and exposure time, respectively. Slide 302 forms part of the contrast control device to be described later. Referring to Fig. 11a, there is shown the rotatable lever 306 which is pivotally supported by shaft 305 and which carries the long cylindrical roller 320. The purpose of this roller is to minimize friction since it comes in contact with the element which causes the rotation of lever 306. The lever 306 is shown in Fig. 11a in its starting position and travels during an exposure in the direction indicated by arrow 300 until its extreme end 321 comes in contact with a switch 313 which will be described later and which terminates both the exposure and the movement of lever 306.

This lever is driven with an adjustable speed by means of a spiral shaped cam 309 which can be seen in cross-section in Fig. 11a, and the shape of which is shown in Fig. 11d. This spiral shaped cam rotates in a counter-clockwise position during an exposure, Fig. 11d, and, since it is in contact with the roller 320, it causes lever 306 to move in the direction of arrow 300 in Fig. 11a. The cam has a hub and is slidably mounted on a shaft 308 of square or otherwise polygonal cross-section. The consequence of this arrangement is that, while the cam will always rotate in unison with shaft 308, it may be, by means of the above mentioned slide 302 and the connecting arm 323, axially shifted to the right or the left, Fig. 11a. It will be obvious that, if the cam is shifted far to the left, only a relatively small angle of rotation will be necessary in order to cause lever 306 to travel from its starting position, as shown in Fig. 11a, to the end position in which the extreme tip of lever 306 which is called 321 comes in contact with the leaf spring 312 of switch 313, thereby terminating the exposure. By the same token, if cam 309 is shifted far to the right, it must travel almost a full revolution in order to cause the same movement of lever 306 and, since the speed of rotation of the cam is constant, a much shorter time is required to perform this movement in the first case than in the second case.

The square shaft 308 is driven by a motor 307 which is mounted on a bracket 310 fastened to time switch housing 301. This motor is a small synchronous motor of the type used for electric clocks. These motors are commercially available with a built-in speed reducing gear of any desired ratio and with a magnetically operated gear shift which automatically engages and disengages the gear train when the motor is energized and deenergized. The drive shaft is then free to be returned to the starting position by suitable means such as springs or gravity.

A switch 313 is arranged within the housing in such a manner that it can be actuated by the extreme tip 321 of lever 306. This switch must have lock-in characteristics, i. e., it must stay in its new position even after the removal of the actuating force and not automatically, by spring force or other means, return to its original position. In order to return it to its original position a special resetting device is provided by means of which the entire cycle of operations can be started. A switch of this type is known as a switch of the "maintained contact" type and switches of this type are commercially available as so-called "microswitches." The resetting device is actuated by a push button 304 which protrudes through the top wall of housing 301.

The wiring diagram of the time switch is shown in Fig. 12, which shows the motor 307, the switch 313 with the resetting button 304, and the incandescent lamp 331 which represents the lamp of the enlarger. Fig. 12 also shows a switch 314 and a solenoid 330 which form part of the contrast control device to be described later. Switch 313 is of the normally closed type, i. e., it is closed until some force exerts pressure on the leaf spring 312 and opens it. The switch will then remain open until pressure upon the resetting push button 304 closes it again. Therefore, before an exposure, the switch will be open, having been opened at the end of the previous exposure by contact with tip 321 of lever 306. The operator now initiates an exposure by depressing for a short time push button 304, thereby closing switch 313. The motor 307 and the lamp 331 are now energized, or the exposure begins, and motor 307 drives shaft 308 and cam 309 thereby moving lever 306 in the direction of arrow 300. After a certain time, depending upon the position of cam 309, the tip 321 of lever 306 will come in contact with the actuating leaf spring 312 of switch 313 thereby opening it and terminating the exposure. At the beginning of the exposure the magnetized armature of motor 307 automatically throws the gear shift into operating position, but releases it at the end of the exposure, i. e., after interruption of the circuit by switch 313. The cam 309 and the shaft 308 thereupon return automatically to their starting positions and permit lever 306 to drop down to its original position as shown in Fig. 11a. If the operator depresses push button 304 again, this cycle, of course, will be repeated.

Contrast control

While the contrast control device theoretically may be of any desired type, the only really practical way to control contrast of photographic prints known at this writing makes use of a variable contrast paper capable of delivering prints of any desired contrast depending upon the wave length of the light to which it is being exposed. A very high degree of contrast is obtained with blue light, while a very "soft" gradation results from exposure to yellow light. Intermediate degrees of contrast may be obtained by mixing the two colors in the proper proportion. This again can be done by any desired means, for example, by using suitable color filters which may vary from pure blue through a number of blue-yellow mixtures, green, to pure yellow. It is also possible to divide the total exposure time in two part exposure times with blue and yellow, respectively, and this is the method which we prefer to use in connection with this invention.

The color control device, therefore, comprises two principal parts, a color changing device rendering the light of the enlarger either blue or yellow and a timing device permitting the application of these colors for the two part exposures in the proper proportion without, however, changing the total length of the exposure time. The ratio of the two part exposures with the two colors can be controlled easily by merely adding an adjustable contact to the time switch described above. This switch has been shown in Figs. 11b, 11c and 12 as 314. This switch is of the ordinary "momentary contact" type, i. e., it is normally open and becomes closed as soon as its actuating spring 311 is depressed by suitable means, but immediately upon release of the actuating force it returns automatically to its original open position. This switch is mounted on a lever 315, Fig. 11b, which is pivotally supported by the same shaft 305 that also carries the rotatable lever 306, Figs. 11b and 11d. This lever 315 is biased by a spring 324 which tends to urge it into its uppermost position. It is restricted in this tendency, however, by a cam 326 in contact with a small roller 325 supported by lever 315, Fig. 11b. Cam 326 is, by means of a connecting member 327, fastened to slide 302 which protrudes through the front face of the timer housing and which coacts with a scale visible in Fig. 1 and arbitrarily divided into a hundred divisions of contrast.

Attached to the aforementioned lever 306 is a connecting arm 331 which carries a cam 330. Cam 330 participates in the travel of lever 306 in the direction of arrow 300 and comes at some point of this travel in contact with the actuating spring 311 of switch 314. When this occurs, switch 314 closes a circuit which energizes an electromagnetic element 341 which, in turn, actuates the color changing device to be described later, see wiring diagram in Fig. 12. It depends obviously upon the position of switch 314 when this will take place and the position of switch 314 can be changed by shifting cam 326 to the right or to the left. This will be quite clear from Fig. 11b.

The addition of contact 314 thereby converts the simple timer described in the preceding paragraph into a timer which is capable of being adjusted to a definite exposure time which is divided into two parts. The sum of two parts is constant, and depending upon the position of slide 303 which controls the position of spiral shaped cam 309 relative to the rotatable lever 306. The ratio of the "yellow" to the "blue" exposure time can be selected by the operator by moving slide 302 which, in turn, slides cam 326 to the left or to the right, thereby rotating 315 around its pivot 305 and changing the relative position of switch 314 with respect to the cam 330 which is attached to lever 306. Switch 314 will, therefore, be depressed sooner or later during the rotary travel of lever 306 or, more specifically, of cam 330 attached thereto, and any combination can be obtained of long "yellow" or short "blue," or short "yellow" and long "blue" exposure time without affecting the total exposure time which depends upon the position of slide 303 and cam 309 only.

The color changing device may be of any convenient design and merely by way of example, we show two preferred designs which use color filters or colored reflectors, respectively.

A device using colored filters is shown in Fig. 1 and in detail in Figs. 13a and 13b. It consists essentially of a filter holder 336 which carries two filters 337 and 338, respectively, these filters being of blue or yellow color, respectively. This filter holder is pivotally supported by a shaft 339 mounted in a base plate 340 which, in turn, can be attached to the enlarger in such a way that the light beam has to pass one of the two filters. A solenoid 341 is mounted on the base plate 340, together with a return spring 351, and depending upon whether the solenoid is energized or not, either filter 338 or 337 will be interposed into the light beam, thereby coloring it either yellow or blue. Solenoid 341 is in series with the aforementioned switch 314, see wiring diagram, Fig. 12. It will, therefore, be energized during the second part of the exposure, the ratio of the first to the second part depending upon the position of switch 314 relative to its actuating cam 330 as shown in Fig. 11b and as explained above.

A different form of color control device can be used in connection with enlargers broadly disclosed in three co-pending applications Serial No. 577,216, No. 609,873 and No. 614,208, all filed by Louis L. Weisglass, one of the co-inventors on February 10, 1945, August 9, 1945, and September 4, 1945, respectively.

The projector assembly of this enlarger comprises a conventional enlarging lens and a conventional condenser, but the source of light is a diffusely reflecting surface disposed substantially in the focal point of this condenser and illuminated by at least one spotlight. Compared to the conventional arrangement in said focal point of a lamp with an opal vessel and emitting diffused light, this arrangement offers a much better utilization of the available light and permits the application of much higher wattages than heretofore possible. For a detailed description of the general principle involved and for a discussion of the gains in efficiency and light output, we wish to refer to the aforementioned co-pending application Serial No. 577,216.

A color control device applicable to this type of enlarger is shown in Figs. 14 and 15, showing the lamphousing only. This lamphousing consists of the main housing 430, the condenser with the condenser housing 431 and the condenser lenses 422, the two spotlights 433, and the colored reflector assembly.

Two reflectors 460 and 461 are provided which are mounted on opposite sides of a supporting plate 462. This supporting plate is fastened to a shaft 463 which terminates in a spur gear 464. The entire assembly is mounted in a housing 465 and a small motor 466 is provided which, by means of another spur gear 467 drives the aforementioned gear 464. The motor 466 is of the type which may be stalled for prolonged periods of time without overheating and which is commonly called "torque motor." The rotation of the supporting plate 462 is confined to 180° by means of a fixed stop 468 and a stop pin 469 on gear 464, and a spring 470 is provided which returns the reflector assembly to its original position as soon as the motor 466 is deenergized. An arrangement of this type can very advantageously be used in connection with a variable contrast paper of the kind mentioned before, and the two reflector plates 460 and 461 will be of a yellow and blue color, respectively. The first portion of the exposure is given with the reflector assembly in the position shown in Fig. 14, i. e., reflector 460 in the lower or effective position. After a certain portion of the exposure has elapsed, current is supplied to the motor 466 which, by means of the gears 467 and 464 rotates shaft 463 and, therewith, the supporting plate 462 with the two reflectors 460 and 461. This rotation will come to a stop after 180° when the stop pin 469 comes in contact with the stop 468. From then on, the reflector plate 461 which originally was in the upper or inactive position will be in the lower position and the balance of the exposure will, therefore, be given by the color determined by the reflector plate 461. After the exposure is finished, the motor 466 is disconnected, whereupon spring 470 returns the entire reflector plate assembly to its original position. The circuit shown in Fig. 12 remains the same, motor 466 simply taking the place of solenoid 341.

The time switch and contrast control device described in the two preceding paragraphs have been fully disclosed in the aforementioned Patent No. 2,414,333 and reference is made to this patent for a more complete description of this device and of its underlying principles.

*Automatic means to set the time switch*

Automatic means are provided to set the length of the exposure in accordance with the intensity of the light impinging upon a selected point of the easel. It is theoretically immaterial whether the exposure time is set in accordance with the light intensity as measured on the brightest point of the easel or as measured on the darkest point of the easel, and it is even conceivable to use the average value of the two. In practice, however, it is most convenient to set the exposure time in accordance with the light intensity as measured on the brightest point on the easel because the intensity of this point obviously can be measured with the best of accuracy. This simply means that a print is exposed in such a manner that well exposed shadows are being obtained and this is also in accordance with best photographic practice.

As has been explained above, there is a so-called "first member" which is adapted to be moved in accordance with the light intensity as measured on the brightest point of the easel, or, more accurately, in accordance with the logarithmic value of this light intensity, since it is preferred to have a logarithmically attenuated rheostat. The time switch on the other hand, as can be easily seen from Figs. 1 and 11a has, by necessity, a dial with divisions which are evenly or linearly spaced. It becomes, therefore, necessary to interpose between the first member and the time switch a mechanism which translates logarithmic into linear values. The most commonly used means for purposes of this character are cam and lever movements, but it will be found that the logarithmic function is difficult to reproduce by cams since the cams tend to become inconveniently steep, thereby impeding the easy movement of the mechanism. Therefore, a very simple linkage system has been provided which translates logarithmic into linear values with a degree of approximation which is perfectly satisfactory for the purpose of this invention. This linkage system can be seen in Fig. 2 and again diagrammatically in Fig. 8.

A crank 501 with the center 500 and a radius $R_1$ is associated with the first member. It will be understood that this element need not necessarily have the physical shape of a crank and it is, for example, perfectly possible to mount simply an eccentric pivot 502 on gear 150 which represents the above mentioned "first member." This first crank is connected by means of a connecting rod 503 to a second crank 504 or, more accurately, to a pivot 505. The radius of this second crank will be called $R_2$. This crank 504 is pivotally supported by a shaft 506 and is associated with a third crank 507 which carries a pivot 508. This pivot 508 supports a second connecting rod 509, the other end of which is connected to the slide 303 of the time switch which is visible in Fig. 11d.

The preferred dimensions of this linkage system which give the best approximation of theoretical values have been shown in Fig. 8. The radius of the first crank $R_1$ is the unit in which all other dimensions are being expressed. The radius $R_2$ of the second crank is 1.650 $R_1$, and the distance between the pivot of the first and of the second crank, i. e., between points 500 and 506 equals 2.500 $R_1$. The length of the first connecting rod, i. e., the distance between points 502 and 505 equals 4.000 $R_1$. The length of the third crank 507, i. e., the distance between points 506 and 508 is shown to be the same as the radius of the second crank, but this is subject to arbitrary changes since it has no influence on the accuracy of the linkage, but merely changes the stroke of point 303 which, in turn, depends merely upon the design of the time switch as seen in Fig. 11a. The length of the second connecting rod 509, i. e., the distance between points 508 and 303 has only a negligible influence upon the accuracy of the movement provided that it is not too short.

If a straight line is drawn through point 500 parallel to the straight line on which point 303 travels, and if point 500 is connected to point 506 by another straight line, the two straight lines will form an angle $\alpha$, which may have any convenient value. The angle between the connecting line of points 500 and 506 with one extreme position of the first crank comprises an angle of 75°, and the angle between the connecting line 500 to 506 and the other extreme position of the first crank equals 195°, providing a rotary travel of 120° between the two extreme positions of the first crank. The angle between the second and the third crank, i. e., between lines 505 to 506 and 506 to 508 equals 120−$\alpha$.

There are plotted, on a circle with the radius R₁ around point 500, exposure time values starting with 10 and ending with 100 seconds, these exposure time values being logarithmically spaced on a circular arc of 120°. The values from 10 to 100 seconds are, of course, chosen merely by way of example, and neither the absolute values nor their ratio are necessarily limited in this manner. The corresponding positions 10' to 100' have been marked on a circle with the radius R₂ around point 506 comprising as can be seen, an angle of approximately 90° and already being almost linearly spaced. The corresponding positions of point 508 are also plotted and are called 10'' to 100'', and their spacing is, of course, the same as the spacing of the 10' to 100' values. The slide 303 of the timer moves, of course, on a straight line, and the corresponding positions of exposure time values have been called 10''' to 100'''. In order to demonstrate the relative accuracy of this linkage system, there are plotted above these values the linear values which would be strictly correct, and the ideal system would, of course, show a relationship between the actual travel and the linear travel corresponding to a straight line which has been drawn in the diagram in dotted lines. The actual curve as shown in solid lines deviates from this ideal straight line only by a relatively insignificant amount, and the approximation obtainable with this linkage system is perfectly accurate enough for photographic purposes such as contemplated in this invention. The system, of course, has the great advantage of being extremely simple.

*Automatic means to set the contrast control device*

As has been explained in one of the preceding paragraphs, the so-called "third member" travels in accordance with the ratio of the two light intensities as measured on the brightest and on the darkest point on the easel, respectively, or, expressed differently, in accordance with the difference between the logarithmic values of said two light intensities. Mechanism must be provided to connect the contrast control means, as described, to said third member and, for a better understanding of this mechanism, there is plotted in Fig. 9 a graph which shows schematically the relationship between the contrast, as expressed by the difference of the logarithmic values of the light intensities, and the correct color mixture required for the subsequent print. The figures are typical, but their exact numerical value may differ, depending upon different properties of individual emulsions.

Negatives with very low contrast cannot be printed successfully at all since even with 0% yellow light, 100% blue, the paper will not be contrasty enough to produce a satisfactory picture. A contrast of approximately 1.0 is required to get a good print with zero yellow, 100% blue light. Negatives which have a higher contrast should receive correspondingly less blue and more yellow light and the relationship from then on between contrast and color mixture is very nearly a straight line as shown in Fig. 9. Negatives having a contrast of 1.75 require 100% yellow light, 0% blue, in order to yield a satisfactory print. From then on, perfect prints are no longer obtainable since negatives with a contrast higher than 1.75 would theoretically call for colors with more than 100% yellow content which is manifestly impossible. The relationship between contrast and color mixture, therefore, looks as shown in Fig. 9, good prints being obtainable only between the contrast limits of 1.0 and 1.75. It is not difficult to translate this relationship into a circular cam and this has been shown in Fig. 10a. The effective part of the cam comprises a total angle of 240° and is divided into three parts, the first portion 515 is formed by a circle with a relatively large radius, and the third portion 516 is formed by part of a circle with a relatively small radius, the two being connected by an intermediate portion 517 formed by a spiral.

In Figs. 2a and 10a, this cam with the three portions 515, 516 and 517 can be seen. It is fastened to shaft 159 which, by means of the differential gear drive described above, rotates in accordance with the difference of the logarithmic light intensity values. Lever 518 is pivotally supported by a shaft 519 and carries a cam following roller 520 which is in operative contact with said cam, see Fig. 2. The lever 518 with the cam following roller 520 is biased by a spring and kept thereby in contact with the cam, the spring not being shown in the drawings. On the same shaft 519 is fastened an arm 521, shown in Fig. 2a in dotted lines since it is in a plane far in front of the assembly shown and, therefore, would not ordinarily be visible. It can be seen in Fig. 1 protruding from the cabinet B. Its extreme tip carries a pivot 522 which, in turn, is linked to a connecting rod 523. This connecting rod is then connected to slide 302 of the contrast control device.

Different emulsions of photographic papers of nominally the same brand may differ slightly in their properties and it may, therefore, be advisable to use an adjustable cam instead of the one piece cam shown in Fig. 10a. Such an adjustable cam is shown in Fig. 10b. It comprises a circular base plate 525 fastened to shaft 159, see Fig. 2a. Mounted on this circular base plate are two sector shaped parts, the first one 526 with a relatively large and the second one 527 with a relatively small radius. These parts have slots 528 and 529, respectively, so that their position relative to the circular disc 525 may be adjusted, and lock screws 530 and 531 are provided for this purpose. The two sector shaped parts 526 and 527 are connected by a curved piece 532. This curved link 532 is supported at one end by a pivot 533, fastened to one corner of the large sector 526, and has an elongated slot 534 engaging a pin 535 which, in turn, is fastened to one corner of the small sector 527.

After loosening screws 530 and 529, both sectors 526 and 527 can be adjusted relative to the circular base plate 525 and, while the curved link 532 will have the strictly correct shape only for one specific intermediate position, it will deviate from this correct shape in other positions only by a relatively insignificant amount. By means of this adjustable cam the two significant points of the graph in Fig. 9 which are now at the contrast values of 1.0 and 1.75 may be adjusted to other values in accordance with the properties of the particular emulsion which happens to be used.

*Signalling system for deficient negatives*

An appreciable percentage of all negatives will not yield perfect prints because they are either too dense or not dense enough, or because they have either too much or too little contrast, the third reason—too much contrast—usually predominates. In view of this situation, it has been found advantageous and of great help to an unskilled operator to install a signalling system which indicates automatically these deficiencies.

The signalling system is quite simple and consists essentially of two single pole double throw switches which are in some suitable manner actuated by the first member which moves in accordance with the light intensity of the brightest spot of the easel and by the third member which moves in accordance with the contrast value. An example of such an arrangement has been shown in Figs. 2a and 6. Fastened on shaft 506 is a disc 540 made from suitable insulating material. This disc carries a spring 541 made from Phosphor bronze or beryllium copper or the like. Mounted on base plate 90 which is made from insulating material, as explained above, is a switch segment 542 and similar segments 543, 544 and 545. Referring to Fig. 6, it can be seen that segment 542 is connected to one end of the line, 544 is not connected and 543 and 545 are connected to signalling lamps 546 and 547, respectively, the other ends of these lamps being connected to the other side of the line. The effect of this arrangement is that for negatives within the range of the device the movable switch element 541 will connect part 542 to the unconnected part 544, and both lamps 546 and 547, will, therefore, remain dark. If the negative has insufficient density, contact will be established between 545 and 541, thereby energizing lamp 547. By the same token, if the negative has excessive density, contact will be established between 543 and 541 thereby energizing lamp 546. Signs with a suitable legend are mounted on the top face of cabinet B. These signs are preferably made from some transparent material so that the legend thereupon becomes visible whenever the lamp behind it becomes energized.

A substantially identical switch is connected to shaft 519. Attached to lever 519 is a block 550 made from insulating material carrying a spring 551 made from Phosphor bronze or beryllium copper. This switch establishes contact between switch segments 552 and one of 553, 554 and 555, depending upon its position. 552 is connected to one end of the line, 554 is not connected, and 553 and 555 are connected to lamps 556 and 557, respectively, as can be seen in Fig. 6. These lamps are arranged behind transparent signs indicating either too little or too much contrast.

It will be understood that the instrument described in these specifications can be widely modified without departing from the spirit of this invention. It has already been pointed out that many of the component elements as described are merely preferred designs and that other designs serving broadly the same purpose may very well be substituted. The physical shape of the device may also be widely modified and, for example, the parts contained in cabinets B and D in Fig. 1 may very well be contained in one single cabinet. Other modifications will readily occur to anyone skilled in the art.

What we claim as new, is:

1. An exposure and contrast control device for photographic enlargers of the type which includes a source of light and which projects an image of a photographic negative on a sheet of sensitized material placed on an easel, comprising a photoelectric cell adapted to be placed on said easel for measuring the light intensity of selected points thereon, an electrical circuit operatively connected to said cell and including means to indicate the magnitude of the current passing said cell, a first member adapted to be moved in accordance with the light intensity of the point of brightest illumination on the easel, a second member adapted to be moved in accordance with the light intensity of the point of lowest illumination on the easel, a third member in operative engagement with said first and second members and adapted to be moved by the coaction of said members in accordance with the ratio of said two light intensities, a time switch adapted to control the length of time during which said image will be projected on said sensitized material, means to control the contrast of the print thus obtained comprising means to adjust the color composition of the light to which said print is exposed, means operatively connecting one of said first and second members with said time switch, whereby the length of an exposure is automatically adjusted in accordance with the position of said last mentioned member, and means operatively connecting said third member with said contrast control means, whereby the contrast of the print is automatically adjusted in accordance with the position of said third member.

2. An exposure and contrast control device for photographic enlargers of the type which includes a source of light and which projects an image of a photographic negative on a sheet of sensitized material placed on an easel, comprising a photoelectric cell adapted to be placed on said easel for measuring the light intensity of selected points thereon, an electrical circuit operatively connected to said cell and including means to indicate the magnitude of the current passing the cell, a first member adapted to be moved in accordance with the logarithmic value of the light intensity of the point of brightest illumination on the easel, a second member adapted to be moved in accordance with the logarithmic value of the light intensity of the point of lowest illumination on the easel, a third member in operative engagement with said two other members and adapted to be moved by the coaction of said two other members in accordance with the difference of the logarithmic values of said two light intensities, a time switch adapted to control the length of time during which said image will be projected on said sensitized material, means to control the contrast of the print thus obtained comprising means to adjust the color composition of the light to which said print is exposed, means operatively connecting one of said first and second members with said time switch, whereby the length of an exposure is automatically adjusted in accordance with the position of said last mentioned member, and means operatively connecting said third member with said contrast control means, whereby the contrast of the print is automatically adjusted in accordance with the position of said third member.

3. An exposure and contrast control device according to claim 1, said electrical circuit comprising two part circuits, the first part circuit having an output voltage controlled by said photoelectric cell, the second part circuit having an output voltage controlled by a manually controlled rheostat, means to make said output voltages oppose each other, and means to indicate when the difference between said two output voltages, as a result of said rheostat being adjusted by the operator, assumes a predetermined value.

4. An exposure and contrast control device according to claim 1, said electrical circuit comprising two part circuits, the first part circuit having an output voltage controlled by said photoelectric cell, the second part circuit having an output voltage controlled by a manually controlled logarithmically attenuated rheostat, means to make said output voltages oppose each other, and means to indicate when the difference between said two output voltages, as a result of said rheostat being adjusted by the operator, assumes a predetermined value.

5. An exposure and contrast control device according to claim 1, said electrical circuit comprising two part circuits, the first part circuit having an output voltage controlled by said photoelectric cell, and manually operated means to adjust the light sensitivity of said circuit in accordance with the sensitivity of the sensitized paper on which an enlarged image is being printed, the second part circuit having an output voltage controlled by a manually controlled rheostat, means to make said output voltages oppose each other, and means to indicate when the difference between said two output voltages, as a result of said rheostat being adjusted by the operator, assumes a predetermined value.

6. An exposure and contrast control device according to claim 1, said electrical circuit comprising two part circuits, the first part circuit having an output voltage controlled by said photoelectric cell, and manually operated means to control the input voltage, whereby the light sensitivity of said circuit may be adjusted in accordance with the light sensitivity of the sensitized paper on which an enlarged print is being made, the second part circuit having an output voltage controlled by a manually controlled rheostat, means to make said output voltages oppose each other, and means to indicate when the difference between said two output voltages, as a result of said rheostat being adjusted by the operator, assumes a predetermined value.

7. An exposure and contrast control device according to claim 1, said electrical circuit comprising two part circuits, the first part circuit having an output voltage controlled by said photoelectric cell, the second part circuit having an output voltage controlled by a manually controlled rheostat, said rheostat comprising a resistor and two independently movable contacts in current conducting relationship therewith, these contacts being insulated from each other and connected to a switch whereby one of said contacts may be selected to carry said output voltage, means to make said output voltages oppose each other, and means to indicate when the difference between said two output voltages, as a result of said rheostat being adjusted by the operator, assumes a predetermined value, said first member being operatively connected to one, and said second member to the other of said contacts.

8. An exposure and contrast control device according to claim 1, said electrical circuit comprising two part circuits, the first part circuit having an output voltage controlled by said photoelectric cell, the second part circuit having an output voltage controlled by a manually controlled rheostat, said rheostat comprising a resistor and two rotatable contacts in current conducting relationship therewith, said contacts mounted on coaxial shafts, insulated from each other, and connected to a switch whereby one of said contacts may be selected to carry said output voltage, means to make said output voltage oppose each other, means to indicate when the difference between said two output voltages, as a result of said rheostat being adjusted by the operator, assumes a predetermined value, a train of gears connecting said first member to one of said contacts, and another train of gears connecting said second member to the other of said contacts, one of said trains of gears having one more gear than the other train, whereby the direction in which one of said members moves is reversed, so that the first and the second member move in opposite directions when said two contacts move in the same direction.

9. An exposure and contrast control device according to claim 1, said electrical circuit comprising two part circuits, the first part circuit having an output voltage controlled by said photoelectric cell, the second part circuit having an output voltage controlled by a manually controlled rheostat, said rheostat comprising a cylindrical resistor and two rotatable contacts in current conducting relationship therewith, said contacts mounted on coaxial shafts, insulated from each other, and connected to a switch whereby one of said contacts may be selected to carry said output voltage, means to make said output voltage oppose each other, means to indicate when the difference between said two output voltages, as a result of said rheostat being adjusted by the operator, assumes a predetermined value, a train of gears connecting said first member to one of said contacts, another train of gears connecting said second member to the other of said contacts, one of said trains of gears having one more gear than the other train, whereby the direction in which one of said members moves is reversed, so that the first and the second member move in opposite directions when said two contacts move in the same direction, means to restrict the rotary movement of said first contact to substantially one revolution and the rotary movement of said first member to a fraction of a revolution, and means to permit said second contact to perform a plurality of revolutions, and said second member to perform substantially one revolution.

10. An exposure and contrast control device according to claim 1, said three members being mounted on three independently rotatable coaxial shafts, means causing said first two members to rotate in opposite directions upon an increase in illumination of the brightest and of the darkest point on the easel, respectively, and differential gear means actuated by said first and second members and causing said third member to travel in accordance with the difference between the two respective rotary travels of said first and second members.

11. An exposure meter according to claim 1, said electrical circuit comprising two part circuits, the first part circuit having an output voltage controlled by said photoelectric cell, said photoelectric cell being mounted in a housing including means to adjust the light admittance of said cell in a plurality of steps, the second part circuit having an output voltage controlled by a manually controlled rheostat, said rheostat comprising a cylindrical resistor and two rotatable contacts in current conducting relationship therewith, said contacts mounted on coaxial shafts, insulated from each other, and connected to a switch whereby one of said contacts may be selected to carry said output voltage, means to make said output voltages oppose each other, means to indicate when the difference between said two output voltages, as a result of said rheostat being adjusted by the operator, assumes a predetermined value, a train of gears connecting said first member to one of said contacts, another train of gears connecting said second member to the other of said contacts, one of said trains of gears having one more gear than the other train, whereby the direction in which one of said members moves is reversed, so that the first and the second member move in opposite directions when said two contacts move in the same direction, means to restrict the rotary movement of said first contact to substantially one revolution and the rotary movement of said first member to a fraction of a revolution, means to permit said second contact to perform a plurality of revolutions and said second member substantially one revolution, and means operatively connected to said second member and actuating said means controlling the light admittance of said photoelectric cell after each revolution of said second contact.

12. An exposure and contrast control device according to claim 1, said time switch comprising a pivoted lever, means to rotate said lever, means to adjust the speed of said rotation, and a switch controlling the source of light on the enlarger, said switch adapted to be actuated by said pivoted lever at the end of its travel, whereby said source of light is shut off.

13. An exposure and contrast control device according to claim 1, said time switch comprising a pivoted lever, means to rotate said lever including an electric motor driving a shaft of polygonal cross-section through a train of gears, a spiral shaped cam driving said lever and having a hub with a correspondingly polygonal hole mounted slidably on said shaft, means to adjust the speed of rotation of said lever by sliding said cam on said shaft, and a switch controlling the source of light of the enlarger, said switch adapted to be actuated by said lever at the end of its travel, whereby said source of light is shut off.

14. An exposure and contrast control device according to claim 1, said means to control the contrast of the print comprising means to adjust the color composition of the light to which said print is exposed including a plurality of light filters of different colors, and means to shift one of said filters into a position between the source of light of the enlarger and the easel.

15. An exposure and contrast control device according to claim 1, said means to control the contrast of the print comprising means to adjust the color composition of the light to which said print is exposed including a plurality of reflectors of different colors, and means to shift one of said reflectors into a position where it reflects light coming from the source of light of the enlarger onto the easel.

16. An exposure and contrast control device according to claim 1, said means to control the contrast of the print comprising means to divide the exposure time as controlled by said time switch into two part exposure times, including means to adjust the ratio of said part exposure times without affecting their sum, means to change the color of the light to which said print is exposed, and means to actuate said color changing means at a preselected time during the exposure, whereby the print is exposed to light of one color during the first part exposure and to light of another color during the second part exposure.

17. An exposure and contrast control device according to claim 1, said time switch comprising a pivoted lever, means to rotate said lever, means to adjust the speed of said rotation, and a first switch controlling the source of light on the enlarger and adapted to be actuated by said pivoted lever at the end of its travel, whereby said source of light is shut off, said means to control the contrast of the print comprising means to change the color of the light to which the print is exposed, electromagnetic means to actuate said color changing means, and a second switch controlling said electromagnetic means, said second switch being in operative relationship with said pivoted lever and adapted to be actuated by said lever during its rotation, including means to adjust the position of said second switch relative to said lever, whereby said switch may be actuated sooner or later during the rotary travel of said lever.

18. An exposure and contrast control device according to claim 1, said first member adapted to be moved in accordance with the logarithmic value of the light intensity of the brightest point on the easel, said time switch having a dial with linearly spaced exposure time values, and means operatively connecting said first member to said time switch including a linkage system which translates logarithmic into linear values, whereby the length of an exposure is automatically adjusted in accordance with the light value of the brightest point on the easel.

19. An exposure and contrast control device according to claim 1, said electrical circuit comprising two part circuits, the first part circuit having an output voltage controlled by said photoelectric cell, the second part circuit having an output voltage controlled by a manually controlled rheostat, said rheostat comprising a logarithmically attenuated resistor of cylindrical shape and a rotatable contact in current conducting relationship therewith, means to make said two output voltages oppose each other, means to indicate when the difference between said two output voltages, as a result of said rheostat being adjusted by the operator, assumes a predetermined value, said first member being rotatable and connected by a train of gears to said rheostat contact, said time switch comprising a pivoted lever, means to rotate said lever including an electric motor driving a shaft of polygonal cross-section through a train of gears, a spiral shaped cam driving said lever and having a hub with a correspondingly polygonal hole mounted slidably on said shaft, means to adjust the speed of rotation of said lever by sliding said cam on said shaft, and a switch controlling the source of light of the enlarger, said switch adapted to be actuated by said lever at the end of its travel, whereby said source of light is shut off, and means operatively connecting said first member to said means to slide said cam on said shaft including a linkage system which translates logarithmic into linear values, whereby the length of an exposure is automatically adjusted in accordance with the light value of the brightest point on the easel.

20. An exposure and contrast control device according to claim 1, said electrical circuit comprising two part circuits, the first part circuit having an output voltage controlled by said photoelectric cell, the second part circuit having an output voltage controlled by a manually controlled rheostat, said rheostat comprising a logarithmically attenuated resistor of cylindrical shape and a rotatable contact in current conducting relationship therewith, means to make said output voltages oppose each other, means to indicate when the difference between said two output voltages, as a result of said rheostat being adjusted by the operator, assumes a predetermined value, said first member being rotatable and connected by a train of gears to said rheostat contact, said time switch comprising a pivoted lever, means to rotate said lever including an electric motor driving a shaft of polygonal cross-section through a train of gears, a spiral shaped cam driving said lever and having a hub with a corresponding polygonal hole mounted slidably on said shaft, means to adjust the speed of rotation of said lever by sliding said cam on said shaft, and a switch controlling the source of light of the enlarger, said switch adapted to be actuated by said lever at the end of its travel, whereby said source of light is shut off, and means operatively connecting said first member to said means to slide said cam on said shaft including a linkage system which translates logarithmic into linear values, whereby the length of an exposure is automatically adjusted in accordance with the light value of the brightest point on the easel, said linkage system comprising a first crank fastened to and rotating with said first member, a second crank rotatably mounted at a distance from said first crank, a first connecting rod connecting the crank pins of said first and said second crank, a third crank fastened to and rotating with said second crank, and a second connecting rod, connecting the crank pin of said third crank to said means to slide said cam on said shaft.

21. An exposure and contrast control device according to claim 1, including cam and lever means operatively connecting said third member to said contrast control means.

22. An exposure and contrast control device according to claim 1, including cam and lever means operatively connecting said third member to said contrast control means, said cam being rotatable and comprising a circular part with a relatively large radius, another circular part with a relatively small radius and a spiral shaped portion connecting the two circular parts.

23. An exposure and contrast control device according to claim 1, including an adjustable cam assembly and lever means operatively connecting said third member to said contrast control means, said adjustable cam assembly comprising a base fastened to and rotating with said third member on a common axis, a first sector shaped cam part with a relatively large radius, adapted to be rotated on said common axis relative to said base and to be fastened thereto in a selected position, one corner of said sector carrying a pivot, a second sector shaped cam part with a relatively small radius, adapted to be rotated on said common axis relative to said base and to be fastened thereto in a selected position, one corner of said sector carrying a pin, said pivot and said pin being positioned at adjacent sides of their respective sectors, a third cam part in the shape of a relatively long curved link, having a hole at one end and an elongated slot at the other end, said hole being engaged by said pivot, and said slot by said pin, whereby said link serves as a connection between said two sector shaped cam parts regardless of their positions relative to each other and relative to said base.

24. An exposure and contrast control device according to claim 1, said three members being mounted on three rotatable coaxial shafts, means causing said first two members to rotate in opposite directions upon an increase in illumination of the brightest and of the darkest point on the easel, respectively, and differential gear means actuated by said first two members and causing said third member to rotate in accordance with the difference between the two respective rotary travels of said first two members, said time switch comprising a pivoted lever, means to rotate said lever, means to adjust the speed of said rotation, and a first switch controlling the source of light on the enlarger, said switch adapted to be actuated by said pivoted lever at the end of its travel, whereby said source of light is being shut off, said means to control the contrast of the print comprising means to change the color of the light to which the print is being exposed, electromagnetic means to actuate said color changing means, and a second switch controlling said electromagnetic means, said second switch in operative relationship with said pivoted lever and adapted to be actuated by said lever during its rotation, including means to adjust the position of said second switch relative to said lever, whereby said switch may be actuated sooner or later during the rotary travel of said lever, and cam and lever means operatively connecting said third member to said means to adjust said second switch, said cam being fastened to and rotating with said third member and comprising a circular part with a relatively large radius, another circular part with a relatively small radius and a spiral shaped portion connecting the said two circular parts.

ALFRED SIMMON.
LOUIS L. WEISGLASS.

REFERENCES CITED

The following references are of record in the file of this patent:

UNITED STATES PATENTS

| Number | Name | Date |
| --- | --- | --- |
| 2,183,217 | Goldsmith | Dec. 12, 1939 |